United States Patent
Ferreira

Patent Number: 6,115,601
Date of Patent: Sep. 5, 2000

[54] PAYMENT SCHEME FOR A MOBILE COMMUNICATION SERVICE

[75] Inventor: Ronald Ferreira, Paris, France

[73] Assignee: U.S. Philips Corporation, New York, N.Y.

[21] Appl. No.: 08/950,571

[22] Filed: Oct. 15, 1997

[30] Foreign Application Priority Data

| Oct. 23, 1996 | [EP] | European Pat. Off. | 96202959 |
| Nov. 4, 1996 | [EP] | European Pat. Off. | 96203056 |
| Jun. 3, 1997 | [EP] | European Pat. Off. | 97401237 |

[51] Int. Cl.[7] ............................................. H04L 9/00
[52] U.S. Cl. .................. 455/406; 455/405; 455/410; 379/114; 379/357
[58] Field of Search ...................... 455/405, 406, 455/407, 408, 550, 558, 410; 379/357, 93.22, 114; 380/23, 24, 25; 235/379, 380

[56] References Cited

U.S. PATENT DOCUMENTS

| 5,359,642 | 10/1994 | Castro | 379/121 |
| 5,412,726 | 5/1995 | Nevoux et al. | 380/24 |
| 5,692,132 | 11/1997 | Hogan | 705/27 |
| 5,740,247 | 4/1998 | Violante et al. | 380/24 |
| 5,812,945 | 9/1998 | Hansen et al. | 455/403 |
| 5,850,599 | 12/1998 | Seiderman | 455/406 |

*Primary Examiner*—Dwayne D. Bost
*Assistant Examiner*—Sonny Trinh
*Attorney, Agent, or Firm*—Dicran Halajian

[57] ABSTRACT

In a mobile communication system, communication credits are stored in a secure module 30 of a mobile communication appliance 10. Credits are reloaded over-the-air (OTA) from a reload server 20. For requesting a reload, the secure module 30 generates an authenticated reload request message 50, which is transmitted to the reload server 20. In response to receiving the reload request message 50, the reload server 20 informs the secure module 30 of how many credits have been granted in the form of an authenticated reload grant message 60. Successive messages are made to differ by using different transaction numbers. A received authenticated message is only accepted if a transaction number in the message matches a local transaction number.

20 Claims, 2 Drawing Sheets

PAYMENT SCHEME FOR A MOBILE COMMUNICATION SERVICE

BACKGROUND OF THE INVENTION

The invention relates to a method of paying for a communication service in a mobile communication system comprising at least one mobile communication appliance comprising a secure module for securely storing data. The invention further relates to a mobile communication system comprising at least one mobile communication appliance comprising a secure module for securely storing data. The invention also relates to a mobile communication appliance comprising a secure module for securely storing data. The invention also relates to a secure module for securely storing data.

Increasingly low-cost personal appliances, such as mobile telephones, personal digital assistants (PDAs), and pagers are used for mobile communication. Typically, a user has to pay for the mobile communication service to a service provider based on a subscription fee, complemented by a fee on a per usage basis. The service provider registers the actual usage of the service by the user and charges the user accordingly. Typically a mobile telephone, such as a GSM telephone, comprises a secure module in which an identification is securely stored. The identification is used by the service provider to charge telephone conversations to the user, which is registered as the owner/user of the secure module with the identification. The secure module is typically implemented using smart-card technology.

Particularly for users which do not foresee to frequently use a mobile communication service, the subscription fee may be inhibitive. Furthermore, the need for subscribing to the service excludes certain categories of users from using the service. As an example, a traveller may not stay sufficiently long in an area covered by a service provider to subscribe to the service and be accepted. Some users may be excluded, since they are not considered sufficiently credit-worthy to be accepted for a subscription.

OBJECTS AND SUMMARY OF THE INVENTION

It is an object of the invention to provide a method of the kind set forth which allows a different and reliable way of paying for a mobile communication service.

A method according to the invention is characterised in that the mobile communication system comprises a credit reload server; and in that the method comprises the steps of:

in the secure module: generating a reload request message and authenticating at least part of the reload request message; the reload request message comprising an identification of the secure module and a module transaction number; and in the mobile communication appliance: transmitting the authenticated reload request message to the reload server;

in the reload server: receiving and confirming the authentication of the authenticated reload request message; upon a positive confirmation: verifying whether the module transaction number of the received reload request message matches a server transaction number for the identified secure module; and upon a positive verification: determining a new server transaction number for the identified secure module and storing the new server transaction number as the server transaction number for the identified secure module; generating a reload grant message and authenticating at least part of the reload grant message; the reload grant message comprising an indication of a granted number of communication credits and the server transaction number; and transmitting the secured reload grant message to the mobile communication appliance;

in the mobile communication appliance: receiving the authenticated reload grant message; and in the secure module: confirming the authentication of the authenticated reload grant message; and upon a positive confirmation: determining a new module transaction number from the module transaction number; verifying whether the new module transaction number matches the server transaction number; and upon a positive verification, updating a balance of communication credits stored in the secure module according to the granted number of communication credits and storing the new module transaction number as the module transaction number.

By storing credits for communication in the secure module, the communication service can be used without requiring a subscription. This opens the system for use by categories of users, which so-far have been excluded, such as occasional users or users not considered sufficiently credit-worthy for a conventional subscription to a mobile communication system. It also allows passive use of the appliance, which is free of charge, where the initiating party pays for the communication service. It further simplifies hiring or loaning of a mobile communication appliance, where the appliance is supplied with a 'full' secure module and on return of the appliance, the used credits are charged and the module reloaded for future use. It will be appreciated that the credits may directly represent money (so-called electronic money). Alternatively, other suitable representations of money may be used, such as 'telephone ticks'. The module may be secured in any suitable way, including the use of encryption. The not pre-published patent application PHN 16057, assigned to the assignee of the present application, discloses a way of protecting the secure module against tampering. Advantageously, the credits are reloaded 'over the air' (OTA), using the mobile communication facilities of the appliance. To reduce the chances of fraudulent reloading of the module, the messages or part of the messages are authenticated. To further reduce the chances of fraudulent operations, successive messages are made to differ. This eliminates fraudulent attempts, such as intercepting and 'recording' a reload grant message and repeatedly 'replaying' the reload grant message and in this way achieving unauthorised reloading of the module. The difference in successive messages is advantageously achieved by using a transaction number. A representation of this number is stored in the secure module as well as the reload server. The messages comprise the transaction number of the transmitting party. The receiving party acts upon the message if the received transaction number matches the locally stored transaction number. For a successive transaction a new transaction number is used.

A further embodiment of the method according to the invention is characterised by in the reload server, upon receiving a reload request message comprising a module transaction number outside a predetermined range of the server transaction number, registering an attempt to fraud. A further embodiment of the method according to the invention is characterised by in the mobile communication appliance, upon receiving a reload grant message comprising a server transaction number outside a predetermined range of the module transaction number, registering an attempt to fraud. In this way the transaction number is used to detect attempts to disrupt the system. This is particularly useful in systems where messages may be retransmitted. A situation, which in this way can be covered, is where the reload server has correctly received the reload request message but the secure module is not aware of this (e.g. an acknowledgement scheme is used at communication level, but the acknowledgement is lost or has not yet reached the secure module; or no acknowledgement scheme is used at communication level and the reload grant message has not been received within an expected time frame). As a consequence, the secure module retransmits the same reload request message after a time-out. The reload server can identify the message as a re-transmission, since the transaction number of the message is the same as the transaction which the reload server is currently dealing with or has just completed. Similarly, if the users instructs the secure module to initiate a reload operation before the previous reload has been completed, the reload server may accept the new request as a valid additional reload request to be executed upon completion of the current transaction. Any message with a transaction number outside a predetermined range of previous and/or future transaction numbers can be regarded as an attempt to misuse or disrupt the system. By registering such fraudulent attempts, corrective measures may be taken.

A further embodiment of the method is characterised by the steps of: determining an initial number of communication credits to be debited; determining an account and a financial authority for debiting for the identified secure module; requesting the financial authority to debit the account in accordance with the initial number of communication credits; and, upon a positive response from the financial authority, incorporating the initial number of communication credits in the reload grant message as the granted number of communication credits. By debiting the account before granting communication credits to the secure module, financial risks, such as a loss of credit worthiness, are avoided.

A further embodiment of the method is characterised by the method comprising the steps of the reload server transmitting an acknowledgement message to the mobile communication appliance, after successfully verifying that the module transaction number of the received reload request message matches a server transaction number for the identified secure module. Debiting an account may take considerably longer than is acceptable to wait for by a user of the appliance. To inform the appliance that the request is being dealt with, at application level, an acknowledgement is given, allowing the appliance to take appropriate measures. It will be appreciated that as long as credits are still stored in the secure module, the mobile appliance may still be able to communicate.

A further embodiment of the method is characterised by the method comprising the step of the mobile communication appliance informing a user that reloading of communication credits is in progress, in response to receiving the acknowledgement message. Advantageously, the user is informed of the transaction being in progress.

A further embodiment of the method is characterised by the method comprising the steps of the reload server authenticating at least part of the acknowledgement message; and the secure module, in response to receiving the authenticated acknowledgement message, verifying the authentication of the authenticated acknowledgement message and, upon a positive verification, enabling communicating up to a predetermined negative balance of communication credits. A service provider may determine that a specific user, identified by the secure module identification, is worth a credit up to a predetermined maximum. In such a case, even if the reload has not been completed, the appliance can still be used until the negative balance has reached the maximum credit level. It should be noted that for a conventional communication system a considerable credit level is required, e.g. to cover the fees for a reasonable usage of the communication service over a period of two or three months. In the system according to the invention, the period can be considerably shorter, e.g. up to a couple of days, enabling the usage of considerably lower credit levels. This makes it possible to grant credit to users which otherwise would not have been accepted. The credit level may be stored in the secure module or transmitted to the secure module. The acknowledgement message or the essential parts of the acknowledgement message are authenticated, to avoid fraudulent enabling of the credit facility.

A further embodiment of the method is characterised by the method comprising the step of the secure module, in response to a trigger from the mobile communication appliance to reload a specified number of communication credits, checking whether the specified number of communication credits falls within a predetermined communication credit range stored in the secure module; and acting upon the trigger if the outcome of the checking is positive. Advantageously, an upper limit is stored in the secure module, specifying the maximum number of credits which may be stored in the secure module or may be loaded in one operation. The secure module checks that a request falls within a range defined by the limit, ensuring that only requests for an acceptable reload can be issued. The module may also store a lower limit, ensuring that no requests for a reload of only a few credits can be made, which may be too costly. The limit(s) may be stored in the secure module as permanent limits or, advantageously, be transmitted to the secure module, reflecting actual credit worthiness of the user of the secure module.

A further embodiment of the method is characterised by the method comprising the step of the mobile communication appliance reading the communication credit range and communication credit balance from the secure module and presenting the communication credit range and communication credit balance to a user. In this way, advantageously, the user can select a desired number of credits to be reloaded in view of the current balance and the credit range.

A further embodiment of the method is characterised by the method comprising the step of the mobile communication appliance receiving input from a user requesting a reload of a specified number of communication credits; checking whether the specified number of communication credits falls within the communication credit range read from the secure module; and issuing to the secure module the trigger to reload if the outcome of the checking is positive. In this way, the appliance can immediately inform the user of unacceptable input, allowing the user to correct the input.

A further embodiment of the method is characterised by the reload request message comprising an indication of the communication credit balance and by the step of determining an initial number of communication credits to be debited comprising calculating a minimum of a predetermined upper limit of communication credits and a summation of the balance of communication credits and the requested number of communication credits; and using the minimum as the initial number. By transmitting the balance to the reload server, the reload server can ensure that no more credits are granted to the secure module than allowed. In this way it may, for instance, be possible to limit the damage in case of a fraudulent copy of a secure module.

The invention also relates to a mobile communication system, a mobile communication appliance and a secure module of the kind set forth for practising the method.

BRIEF DESCRIPTION OF THE DRAWINGS

These and other aspects of the invention will be apparent from and elucidated with reference to the embodiments shown in the drawings.

DETAILED DESCRIPTION OF THE PREFERRED EMBODIMENT

Figure 1:
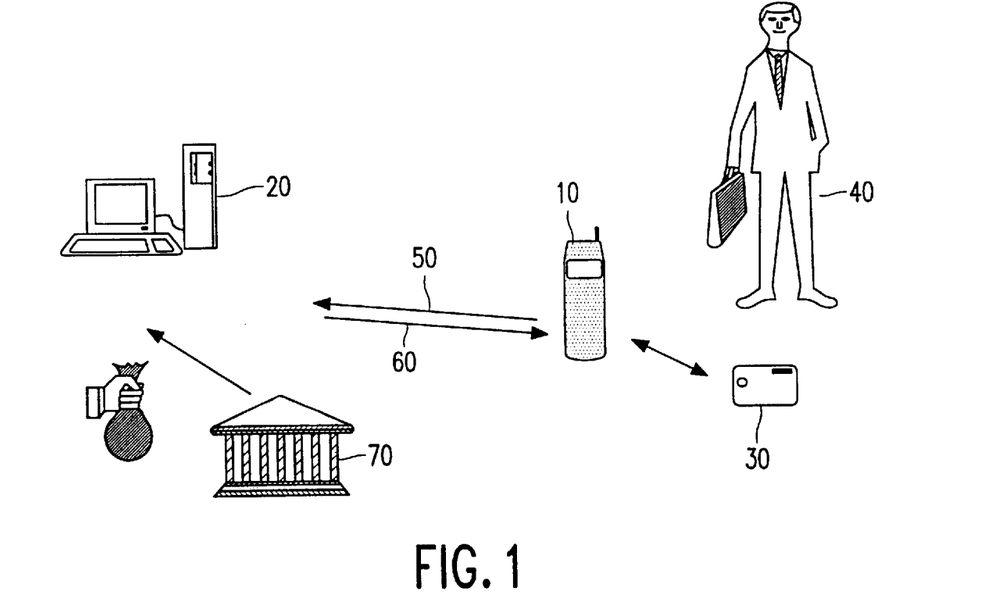
FIG. 1 shows an embodiment of the mobile communication system according to the invention.

FIG. 1 shows an embodiment of the mobile communication system according to the invention. The system comprises at least one mobile communication appliance 10 and a credit reload server 20. The mobile communication appliance 10 may be any suitable mobile appliance capable of bi-directional, wireless telecommunication. An example of such an appliance is a mobile telephone, such as a GSM (Global System for Mobile communication) telephone, or a Personal Digital Assistance (PDA) with wireless communication facilities. The credit reload server 20 may be implemented on a conventional computer suitable for performing financial transactions. The credit reload server 20 may be operated by the service provider of the mobile communication, or any other suitable institution, such as a bank or credit card company. The mobile communication appliance 10 comprises a secure module 30 for securely storing a balance of communication credits. The secure module 30 may also be referred to as SIM (Subscriber Integrated Module). Preferably, the secure module 30 is implemented using smart-card technology. When communication occurs involving the mobile communication appliance 10, communication credits may be removed from the secure module 30. Any suitable method may be used for this. As a consequence of the removing, at certain moments credits need to be reloaded. The initiative for reloading may be taken by a user 40 of the system or automatically by the communication appliance 10 or the secure module 30 within the appliance 10, e.g. when the balance has dropped below a predetermined threshold. A reload request message 50 is generated and authenticated by the secure module 10 and transmitted by the mobile communication appliance 10 to the reload server 20. Preferably, the mobile communication appliance 10 uses the already present means for mobile communication to communicate data messages, such as the reload request message 50, to the reload server 20. As an example, the conventional GSM facilities, such as SMS-Short Message Service, may be used for communicating data messages. A communication identification, such as a telephone number, of the reload server is stored in the mobile appliance 10. This identification may be permanent or may change over time. Preferably, the identification of the reload server 20 is stored securely in the secure module 30. The reload server 20 checks the authentication of the received reload request message 50 and may decide to grant a number of credits. The grant is transmitted to the mobile communication appliance 10 in the form of a reload grant message 60. The reload server 20 debits an account at a financial institution 70, such as a bank, for the corresponding amount of money. To ensure that the correct account is debited, the secure module 30 stores an identification of the secure module. This may be any suitable form of identification, such as IMSI for the GSM system, or MSISDN for ISDN. The module identification or a representation of the module identification is included in the reload request message 50. To be able to debit the money, the reload server 20 determines from the received module identification corresponding financial information, such as a bank account and account owner.

Figure 2:
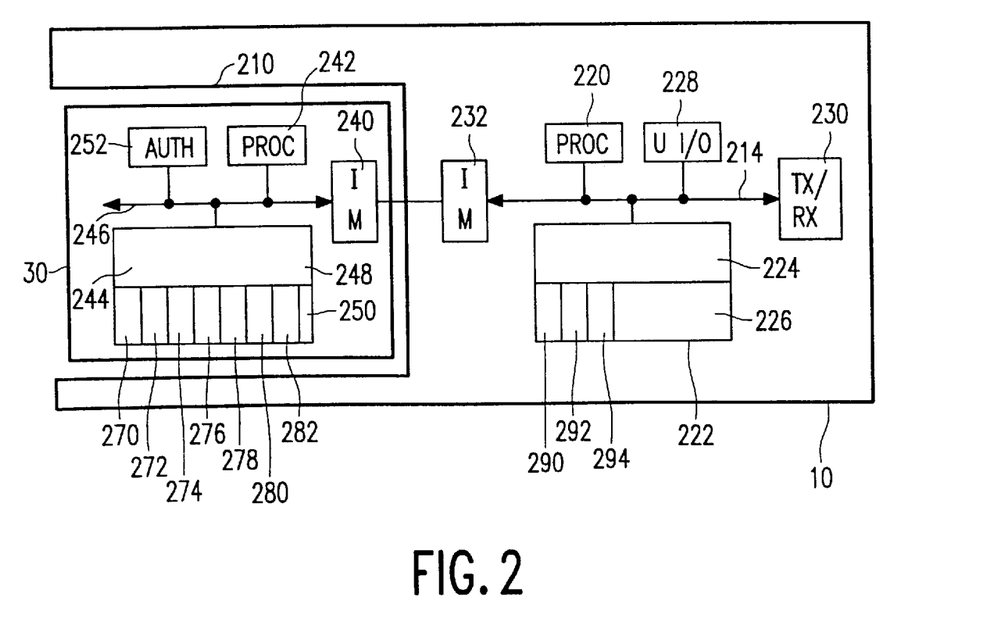
FIG. 2 illustrates a block diagram of the mobile communication appliance with the secure module loaded in a berth of the mobile communication appliance.

FIG. 2 illustrates a block diagram of the mobile communication appliance 10 with the secure module 30 loaded in a berth 210 of the mobile communication appliance 10. The mobile communication appliance 10 comprises a processor 220 and a memory 222, connected to each other, for instance, via a bus 214. The processor 220 may be any suitable processor, such as a micro-controller typically used for a mobile phone or a microprocessor typically used for a portable computer. The memory 222 comprises a data memory 224, such as RAM, for storing data and a program memory 226, such as ROM, for storing program instructions for the processor 220. It will be appreciated that the parts may be implemented as separate units. Alternatively, the memory 222 may be integrated with the processor 220. Also connected to the bus 224 are user interface means 228, such as an LCD display for output and a keyboard for input, and a transceiver 230 for the mobile communication. Any transceiver suitable for communicating to the reload server 20 may be used. The mobile communication appliance 10 interfaces to the secure module via an interface 232 in the mobile communication appliance 10 and an interface 240 in the secure module 30. The secure module 30 also comprises a processor 242 and a memory 244 connected to each other, for instance, via a bus 246. The processor 242 may be any suitable processor, such as a micro-controller typically used for a smart-card. The memory 244 comprises a non-volatile data memory 248, such as non-volatile RAM or flash EPROM, for storing data of a permanent nature (for instance, data, such as the identification and the credit balance, which are relevant for longer than the duration of a communication session or than power is supplied to the mobile communication appliance 10) and a program memory 250, such as ROM, for storing program instructions for the processor 242. Additionally, the memory 244 may comprise a volatile data memory for storing data of a less permanent nature, which may get lost when power is removed from the mobile communication appliance 10. It will be appreciated that the parts may be implemented as separate units. Alternatively, the memory 244 may be integrated with the processor 242. The secure module also comprises an authenticator 252 for authenticating messages. Optionally, the authenticator 252 may also be used for securing some of the data stored in the memory 244 of the secure module 30, for instance by suitably encrypting/decrypting the data. It will be appreciated that the authenticator 252 may also be implemented in software by operating the processor 242 under control of a suitable program stored in the program memory 250. Any suitable authentication scheme may be used, preferably based on a sound encryption algorithm. A suitable example of a symmetrical encryption scheme is DES and of an asymmetrical encryption scheme is RSA (frequently used for public key encryption).

Figure 3:
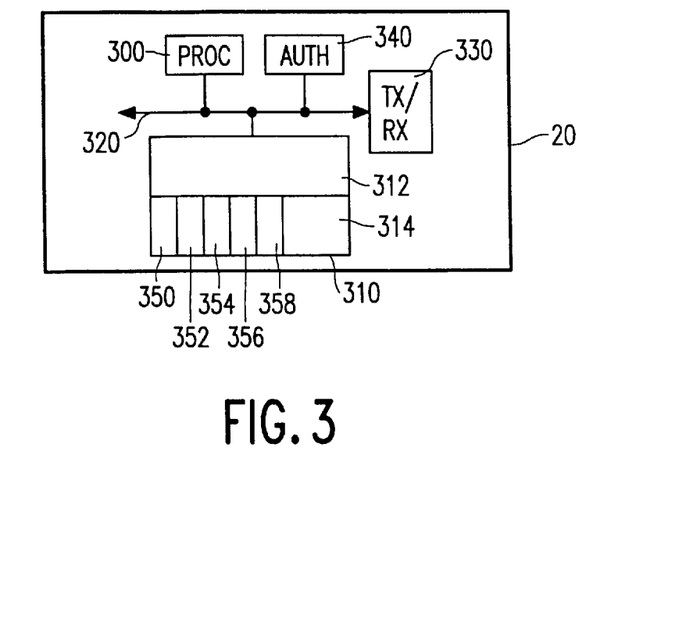
FIG. 3 illustrates a block diagram of the reload server 20.

FIG. 3 illustrates a block diagram of the reload server 20. Preferably, a computer system suitable for performing financial transactions is used for the reload server 20. The reload server 20 comprises a processor 300 and a memory 310, connected to each other, for instance, via a bus 320. The processor 300 may be any suitable processor, for instance a risk processor as typically used in a transaction server. The memory 310 comprises a data memory 312, such as RAM, for storing data and a program memory 314, such as ROM, for storing program instructions. It will be appreciated that the parts may be implemented as separate units. Alternatively, the memory 310 may be integrated with the processor 300. Also connected to the bus 320 is a transceiver 330 for the mobile communication. Any transceiver suitable for communicating to the mobile communication appliance 10 may be used. The reload server 20 also comprises an authenticator 340 for authenticating messages and, optionally, encrypting/decrypting some of the data stored in the memory 310 of the reload server 20. It will be appreciated that the authenticator 340 may also be implemented in software by operating the processor 300 under control of a suitable program stored in the program memory 314. For authenticating the messages exchanged with the secure module 30, obviously, the same or corresponding authentication algorithm is used as used by the authenticator 252 of the secure module 30. For securely storing data in the reload server 20 another algorithm may be used. Preferably, the same algorithm is used for authenticating messages for each secure module in the system, where the algorithm is operated under control of a key which is specific for the module. One way of achieving this is using a master key to generate a specific key for each secure module. For instance, the master key may be used to encrypt the identification of the module, or a representation of the identification of the module. The encrypted identification can then be used as the secure module key. The secure module key is stored in the secure module 30. Authenticated messages generated by the secure module 30 and sent to the reload server 20 comprise the identification of the secure module 30 or a representation of the identification. Based on this information the reload server 20 locates the key corresponding to the secure module 30 and checks the authentication of a received message. The reload server 20 also uses the secure module key to authenticate messages to be send to the secure module 30. The reload server may retrieve the secure module key from a storage or, alternatively, use the master key to regenerate the secure module key. The reload server 20 may also comprise other conventional computer means, such as a display, a keyboard, and a background storage, such as a hard disk.

The secure module 30 comprises means for generating a reload request message and for authenticating at least part of the reload request message. The means may be implemented in software by operating the processor 242 under control of a suitable program module 270 stored in the program memory 250 of FIG. 2. The message may be authenticated by encrypting all elements of the message or at least the essential elements of the message. The encrypted elements may only be present in the resulting authenticated message in an encrypted form. To avoid possible conflicts caused by the message not easily being accessible for certain governmental authorities, it is preferred to also have the encrypted elements present in the secured message in a plaintext format. In this case, it is not required to encrypt the elements in such a way that the elements can be fully retrieved by decrypting the encrypted form of the elements. Instead it is preferred to use a Message Authentication Code (MAC). As is generally known, a message authentication code is generated by a key-dependent one-way hash function, which preferably also reduces the size of the data. The receiving party uses the same key-dependent one-way hash function to hash the plaintext elements and checks whether the resulting MAC (hash value) matches the received MAC. Any suitable key-dependent hashing algorithm may be used. An easy way of generating a MAC is to use a conventional hash function, which compresses the data, and encrypt the resulting hash value with a symmetrical encryption algorithm. Preferably, the MAC is formed by, in a well-known manner, using DES (Data Encryption Standard) in the CBC (Cipher Block Chaining) or CFB (Cipher Feedback) mode. To overcome potential risks due to the relatively short key length of DES, also alternative schemes, such as triple DES, may be used. Preferably, a scheme is used wherein the basic strength of DES is enhanced by a pre-processing step and/or a post-processing step which add (preferably in the form of a binary XOR operation) a further 64-bit key to the 64-bit blocks processed by DES. If both a pre-processing and a post-processing step are used, preferably different keys are used for these steps.

Typically, the secure module 30 is triggered by the mobile communication appliance 10 in response to a user instruction for reloading credits. The secure module 30 may be programmed to automatically determine a number of credits to be reloaded. One way of doing this is to always request a predetermined number of credits or, alternatively, request to be fully reloaded (i.e. request a predetermined maximum number of credits minus the actual balance at the moment of requesting the reload). Preferably, the user 40 of the mobile communication appliance 10 specifies the number of credits to be reloaded. In the latter case, preferably the user 40 is provided with information allowing the user 40 to make a considered decision. To this end, the program memory 250 of the secure module 30 may comprise an optional program module 280 for reading the information from the data memory 248, which may involve decrypting the data, and supplying the information to the mobile communication appliance 10. The program memory 226 of the mobile communication appliance 10 may comprise an optional program module 290 for allowing the processor 220 to present the information to the user 40 via the user interface means 228. The information may include the actual balance at that moment and an upper limit. The upper limit may, for instance, represent a maximum number of credits which at any moment may be stored in the secure module. Preferably, the upper limit represents a maximum number of credits which at that moment may be requested, being the maximum number of credits which at any moment may be stored in the secure module minus the actual balance. In order to reduce costs of reloading the secure module 30, also a minimum limit may be presented to the user. Preferably, the limits are securely stored in the secure module 30 in addition to the actual balance, reducing chances of fraudulent manipulation of the limits. The limits may be permanent. Alternatively, it may be possible to use an authenticated message to change the limits. For instance, at the request of a user a higher limit may be set, if the user has proven to be reliable so-far. Also, the maximum limit may be reduced if a fraudulent copy of a secure module is detected. Advantageously, the secure module 30 comprises means for, in response to a trigger from the mobile communication appliance to reload a specified number of communication credits, checking whether the specified number of communication credits falls within a predetermined communication credit range stored in the secure module; and upon a positive outcome of the checking incorporating the specified number in the reload request message. As will be clear, the credit range is determined by the upper limit and the lower limit. If no explicit lower limit is used in the system, an implied lower limit of one credit may be assumed. The input checking may be implemented in software by operating the processor 242 under control of a suitable checking program module 272 stored in the program memory 250 of FIG. 2. Preferably, the mobile communication appliance 10 checks input from a user before triggering the secure module 30. Therefore, the mobile communication appliance 10 comprises optional means for using the user interface means 228 to receive input from a user requesting a reload of a specified number of communication credits; for checking whether the specified number of communication credits falls within the communication credit range read from the secure module; and for issuing to the secure module the trigger to reload if the outcome of the checking is positive. These tasks may be implemented by the processor 220 under control of a program module 292.

Figure 4A:
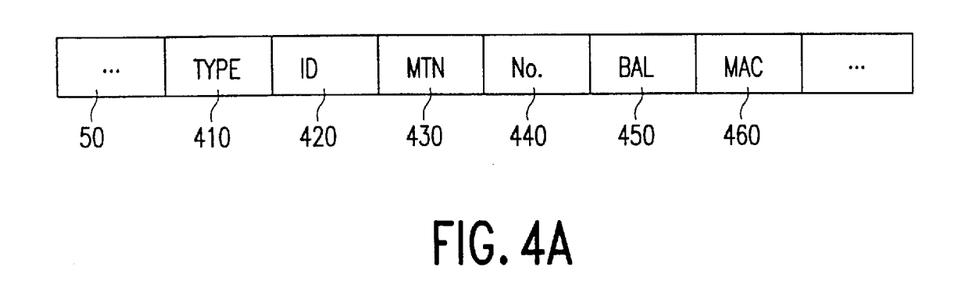
FIG. 4 illustrates a frame structure of the reload request and reload grant messages.

The secure module 30 further securely stores a module transaction number in the data memory 248. As part of generating the reload request message, the secure module 30 loads the current value of the module transaction number in a field 430 of the reload request message 50, as illustrated in FIG. 4A. The reload request message 50 further comprises in field 420 the identification or a representation of the identification of the secure module and in field 460 the Message Authentication Code (MAC). Typically, the reload request message 50 also comprises a field 440 for indicating how many credits are requested. It will be appreciated that this field is not required if only a fixed number of credits can be requested and the reload server 20 already knows the fixed number. Preferably, the reload request message 50 also comprises a type field 410, allowing for easy distinction between different types of messages. A fixed, uniform code is then used for each reload request message 50. Advantageously, the reload request message 50 also comprises an additional field 450 for transferring the actual balance of communication credits from the secure module to the reload server 20. It will be appreciated that the reload request message 50 may comprise various other fields, such as used in conventional communication systems.

The transceiver 230 of FIG. 2 is used to transmit the authenticated reload request message 50 to the reload server 20. Typically, the authenticated reload request message 50 is embedded in an overall frame structure used for transmitting data in the mobile communication system. It will be appreciated that this may involve supplying some form of identification, such as a telephone number or communication address, of the reload server to the transceiver 230.

In the reload server 20, the processor 300, as shown in FIG. 3, uses the transceiver 330 to receive the authenticated reload message and uses the authenticator 340 to decrypt the message or, if a Message Authentication Code is used, check the Message Authentication Code. The processor 300 performs this task under control of a program module 350 stored in the program memory 314 of the reload server 20. If a Message Authentication Code (MAC) is used and the received MAC does not match the MAC of field 460 of the reload request message 400 of FIG. 4A, the message is not acted upon. Particularly, if based on other information, such as checksums or bit timing/synchronisation information at communication level, it can be concluded that the message is not corrupted during transmission, then most likely the message has been tampered with and, optionally, an attempt to fraud is registered. The processor 300 performs the fraud detection under control of a program module 352 stored in the program memory 314 of the reload server 20. If the authentication of the message has been successfully confirmed, the reload server 20 verifies whether the module transaction number of the received reload request message matches a server transaction number for the identified secure module. The verification may be based on a straightforward test of both transaction numbers being identical. It will be appreciated that also a more complicated comparison test may be performed. Upon a positive verification, the reload server 20 determines a new server transaction number for the identified secure module. In a simple form, this may imply increasing the server transaction number with a predetermined number, such as one. Also a more complicated algorithm, such as using random numbers, may be used. It will be appreciated that, since the transaction numbers of the secure module 30 and the reload server 20 need to match, both devices need to use the same or matching algorithm for determining new transaction numbers. The reload server 20 stores the new server transaction number as the server transaction number for the identified secure module. Next, the reload server 20 determines how many credits may be granted to the secure module 20 and generates a reload grant message, specifying the granted number. The reload server 20 uses the authentication means 340 to authenticate at least part of the reload grant message 60. The processor 300 performs these tasks under control of a program module 354 stored in the program memory 314 of the reload server 20.

Figure 4B:
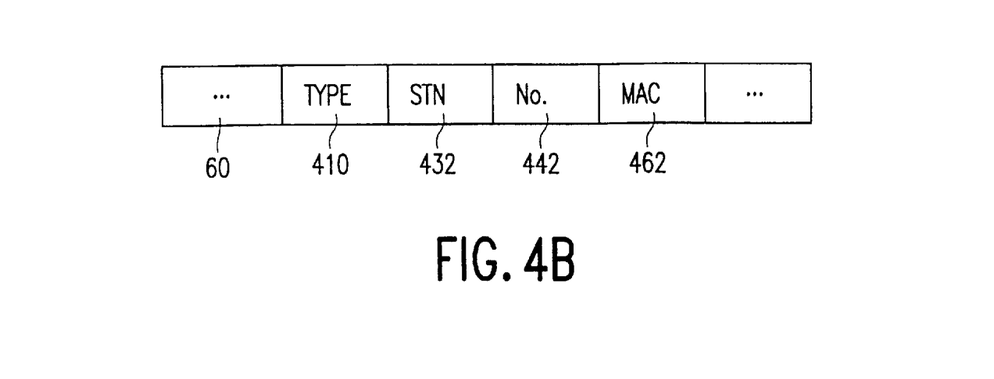

FIG. 4B illustrates the reload grant message 60. As part of generating the reload grant message 60, the reload server 20 loads the current value of the server transaction number in a field 432 of the reload grant message 60. The reload grant message 50 further comprises in field 462 the Message Authentication Code (MAC) and in a field 442 the number of credits, which have been granted. It will be appreciated that this field is not required if only a fixed number of credits can be granted and the secure module 30 already knows the fixed number. Preferably, the reload grant message 60 also comprises a type field 410, allowing for easy distinction between different types of messages. A fixed, uniform code is then used for each reload grant message 60, where this code, preferably, differs from the code used for reload request messages. It will be appreciated that the reload grant message 60 may comprise various other fields, such as used in conventional communication systems.

The reload server 20 uses the transceiver 330 to transmit the authenticated reload grant message to the mobile communication appliance 10. The transmission may occur under control of the processor 300 of FIG. 3, loaded with a suitable program from the memory 314. The mobile communication appliance 10 uses the transceiver 230 to receive the authenticated reload grant message. The reception may occur under control of the processor 220 of FIG. 2, loaded with a suitable program from the memory 224. Optionally, based on other information, such as checksums or bit timing/synchronisation information at communication level, it can be concluded that the message is corrupted during transmission. If so, the message may be discarded. A message, which is assumed to have been received correctly, is transferred to the secure module 30 for further processing. The secure module 30 uses the authenticator 252 to decrypt the message or, if a Message Authentication Code is used, check the Message Authentication Code. The processor 242 of the secure module 30 performs this task under control of a program module 274 stored in the program memory 250. If a Message Authentication Code (MAC) is used and the received MAC does not match the MAC of field 462 of the reload grant message 60 of FIG. 4B, the message is not acted upon. Instead, an attempt to fraud may be registered. The processor 242 performs the fraud detection under control of a program module 276 stored in the program memory 250. If the authentication of the message has been successfully confirmed, the secure module 30 verifies whether the server transaction number of the received reload grant message matches the module transaction number. The verification algorithm will typically be the same as used in the reload server. Upon a positive verification, the secure module 30 determines a new module transaction number. The secure module 20 stores the new module transaction number as the module transaction number to be used for the next reload request. The processor 242 performs these tasks under control of a program module 278 stored in the program memory 250 of the secure module 30.

In a further embodiment according to the invention, the reload server 30 comprises means for, upon receiving a reload request message comprising a module transaction number outside a predetermined range of the server transaction number, registering an attempt to fraud. The processor 300 may perform this additional fraud detection under control of the fraud detection program module 352 stored in the program memory 314 of the reload server 20. The range may be chosen to suit the system best. In a straightforward implementation, a reload request message with the a transaction number matching the current server transaction number is accepted and all other messages are regarded as fraudulent. In a more advanced system, messages may be retransmitted and the transaction number is also used to differentiate between retries and attempts to disrupt the system. As an example, a reload request message may be retransmitted if no reload grant message is received within a predetermined time frame. Alternatively or additionally, at a lower communication level a received message may be checked for correctness in a conventional way, such as checking a checksum or checking timing or synchronisation signals. If no error is detected, a communication acknowledgement may be transmitted. This may be a special signal or a special message. Optionally, for certain detected errors a negative acknowledgement may be transmitted. If the mobile communication appliance 10 does not receive a positive acknowledgement within a predetermined time frame, the reload request message may be retransmitted. The retransmitted message is identical to the originally transmitted message. The reload server 20 can identify the message as a retransmission, since the transaction number of the message is the same as the transaction which the reload server 20 is currently dealing with or has just completed (if the reload server has already updated the server transaction number, but the secure module has not yet received or processed the corresponding reload grant message). Similarly, if the user instructs the secure module 30 to initiate a reload operation before the previous reload has been completed, the reload server 20 may accept the new request as a valid additional reload request to be executed upon completion of the current transaction. Any message with a transaction number outside such a predetermined range of previous and/or future transaction numbers can be regarded as an attempt to misuse or disrupt the system. By registering such fraudulent attempts, corrective measures may be taken.

In a further embodiment according to the invention, similar to the reload server 20, the mobile communication appliance 10 comprises means for, upon receiving a reload grant message comprising a server transaction number outside a predetermined range of the module transaction number, registering an attempt to fraud. The processor 242 may perform this additional fraud detection under control of the fraud detection program module 276 stored in the program memory 250 of the secure module 30.

In a further embodiment according to the invention, the reload server 20 determines an initial number of communication credits to be debited. In a simple system, this initial number may be fixed. Alternatively, the reload server 20 reads an indication of the communication credit balance from field 450 of the reload request message 50, as shown in FIG. 4A and determines the initial number of communication credits to be debited talking the balance into account. Preferably, the reload server 20 does not grant more credits than requested or allowed for, as specified by a predetermined upper limit of credits for the secure module. This upper limit may be a fixed, uniform limit for all secure modules. Alternatively, the upper limit may be specific for the secure module. The reload server 20 can meet those requirements by calculating a minimum of the predetermined upper limit U and a summation of the balance B and the requested number R of communication credits (min{U, B+R}) and using the minimum as the initial number. Advantageously, the reload server 20 checks whether the corresponding amount of money can be debited, before actually granting the credits. The reload server 20 may perform this operation by determining an account and a financial authority for debiting for the identified secure module, and next requesting the financial authority to debit the account in accordance with the initial number of communication credits. Upon a positive response from the financial authority, the reload server 20 incorporates the initial number of communication credits in field 442 of the reload grant message 60 as the granted number of communication credits. These tasks may be performed by the processor 300 under control of a program module 356 stored in the program memory 314 of the reload server 20.

In a further embodiment according to the invention, the reload server 20 comprises means for causing the transceiver 330 to transmit an acknowledgement message to the mobile communication appliance 10, after successfully verifying that the module transaction number of the received reload request message matches the server transaction number for the identified secure module. This task may be performed by the processor 300 under control of a program module 358 stored in the program memory 314 of the reload server 20. Preferably, the mobile communication appliance 10 comprises means for informing the user 40 that reloading communication credits is in progress, in response to receiving the corresponding acknowledgement message from the reload server. This task may be performed by the processor 220 under control of a program module 294 stored in the program memory 226 of the mobile communication appliance 10.

In a further embodiment according to the invention, the reload server 20 uses the authentication means 340 to authenticate at least part of the acknowledgement message. This task may be performed by the processor 300 under control of the same program module 358 as used to control the transmission of the acknowledgement message. The secure module 30 comprises means for, in response to receiving the authenticated acknowledgement message, verifying the authentication of the authenticated acknowledgement message and, upon a positive verification, enabling communicating up to a predetermined negative balance of communication credits. This task may be performed by the processor 242 under control of a program module 282 stored in the program memory 250 of the secure module 30.

It will be appreciated, that the system may be enhanced even further by the secure module 30 generating a further acknowledgement, in response to having successfully loaded new credits, in order to inform the reload server 20 that the granting has been completed. If the reload server 20 does not receive the acknowledgement message, the reload server 20 may take corrective measures, such as retransmitting the reload grant message or accepting a reload request message with a module transaction number matching the previous server transaction number (indicating that the secure module retries the previous reload request message). Preferably, the secure module 30 authenticates the further acknowledgement message.

I claim:

1. A method of paying for a communication service in a mobile communication system comprising at least one mobile communication appliance comprising a secure module for securely storing data; wherein the mobile communication system comprises a credit reload server; and in that the method comprises the steps of:

in the secure module: generating a reload request message and authenticating at least part of the reload request message; the reload request message comprising an identification of the secure module and a module transaction number; and in the mobile communication appliance: transmitting the authenticated reload request message to the reload server;

in the reload server: receiving and confirming the authentication of the authenticated reload request message; upon a positive confirmation: verifying whether the module transaction number of the received reload request message matches a server transaction number for the identified secure module; and upon a positive verification:

determining a new server transaction number for the identified secure module and storing the new server transaction number as the server transaction number for the identified secure module;

generating a reload grant message and authenticating at least part of the reload grant message; the reload grant message comprising an indication of a granted number of communication credits and the server transaction number; and transmitting the secured reload grant message to the mobile communication appliance;

in the mobile communication appliance: receiving the authenticated reload grant message; and in the secure module: confirming the authentication of the authenticated reload grant message; and upon a positive confirmation:

determining a new module transaction number from the module transaction number;

verifying whether the new module transaction number matches the server transaction number; and upon a positive verification, updating a balance of communication credits stored in the secure module according to the granted number of communication credits and storing the new module transaction number as the module transaction number;

the method further comprising registering an attempt to fraud upon receiving one of a reload request message having a module transaction number outside a predetermined range of the server transaction number and upon receiving a reload grant message having a server transaction number outside another predetermined range of the module transaction number.

2. A method as claimed in claim 1, wherein the method comprises:

determining an initial number of communication credits to be debited;

determining an account and a financial authority for debiting for the identified secure module;

requesting the financial authority to debit the account in accordance with the initial number of communication credits; and upon a positive response from the financial authority, incorporating the initial number of communication credits in the reload grant message as the granted number of communication credits.

3. A method as claimed in claim 1, wherein the method comprises the steps of the reload server transmitting an acknowledgement message to the mobile communication appliance, after successfully verifying that the module transaction number of the received reload request message matches a server transaction number for the identified secure module.

4. A method as claimed in claim 3, wherein the method comprises the step of the mobile communication appliance informing a user that reloading communication credits is in progress, in response to receiving the acknowledgement message.

5. A method as claimed in claim 3, wherein the method comprises the steps of:

the reload server authenticating at least part of the acknowledgement message; and the secure module, in response to receiving the authenticated acknowledgement message, verifying the authentication of the authenticated acknowledgement message and, upon a positive verification, enabling communicating up to a predetermined negative balance of communication credits.

6. A method as claimed in claim 1, wherein the method comprises the step of the secure module, in response to a trigger from the mobile communication appliance to reload a specified number of communication credits:

checking whether the specified number of communication credits falls within a predetermined communication credit range stored in the secure module; and upon a positive outcome of the checking, incorporating the specified number in the reload request message.

7. A method as claimed in claim 6, wherein the method comprises the step of the mobile communication appliance reading the communication credit range and communication credit balance from the secure module and presenting the communication credit range and communication credit balance to a user.

8. A method as claimed in claim 7, wherein the method comprises the step of the mobile communication appliance receiving input from a user requesting a reload of a specified number of communication credits; checking whether the specified number of communication credits falls within the communication credit range read from the secure module; and issuing to the secure module the trigger to reload if the outcome of the checking is positive.

9. A method as claimed in claim 2, wherein the reload request message comprises an indication of the communication credit balance and wherein determining the initial number of communication credits to be debited comprises calculating a minimum of a predetermined upper limit of communication credits and a summation of the balance of communication credits and the requested number of communication credits; and using the minimum as the initial number.

10. A mobile communication system comprising at least one mobile communication appliance comprising a secure module for securely storing data; wherein the mobile communication system comprises a credit reload server;

the secure module comprises means for generating a reload request message and for authenticating at least part of the reload request message; the reload request message comprising an identification of the secure module and a module transaction number;

the mobile communication appliance comprises transmission means for transmitting the authenticated reload request message to the reload server;

the reload server comprises:

reception means for receiving the authenticated reload request message;

confirmation means for confirming the authentication of the authenticated reload request message;

means for, upon a positive confirmation, verifying whether the module transaction number of the received reload request message matches a server transaction number for the identified secure module, and upon positive verification:

determining a new server transaction number for the identified secure module and storing the new server transaction number as the server transaction number for the identified secure module;

generating a reload grant message and authenticating at least part of the reload grant message; the reload grant message comprising an indication of a granted number of communication credits and the server transaction number; and transmission means for transmitting the authenticated reload grant message to the mobile communication appliance;

the mobile communication appliance further comprises reception means for receiving the authenticated reload grant message; and the secure module further comprises:

means for confirming the authentication of the authenticated reload grant message;

means for, upon a positive confirmation, determining a new module transaction number from the module transaction number, verifying whether the new module transaction number matches the server transaction number, and, upon positive verification, updating a balance of communication credits stored in the secure module according to the granted number of communication credits and storing the new module transaction number as the module transaction number;

wherein one of said reload server and said mobile communication appliance comprises means for registering an attempt to fraud upon receiving one of a reload request message having a module transaction number outside a predetermined range of the server transaction number and upon receiving a reload grant message having a server transaction number outside another predetermined range of the module transaction number.

11. A communication system as claimed in claim 10, wherein the reload server comprises means for:

determining an initial number of communication credits to be debited;

determining an account and a financial authority for debiting for the identified secure module;

requesting the financial authority to debit the account in accordance with the initial number of communication credits; and upon a positive response from the financial authority, incorporating the initial number of communication credits in the reload grant message as the granted number of communication credits.

12. A communication system as claimed in claim 10, wherein the reload server comprises means for causing the transmission means to transmit an acknowledgement message to the mobile communication appliance, after successfully verifying that the module transaction number of the received reload request message matches a server transaction number for the identified secure module.

13. A communication system as claimed in claim 10, wherein the secure module comprises means for, in response to a trigger from the mobile communication appliance to reload a specified number of communication credits, checking whether the specified number of communication credits falls within a predetermined communication credit range stored in the secure module; and upon a positive outcome of the checking incorporating the specified number in the reload request message.

14. A communication system as claimed in claim 11, wherein the reload request message comprises an indication of the communication credit balance and wherein determining the initial number of communication credits to be debited comprises calculating a minimum of a predetermined upper limit of communication credits and a summation of the balance of communication credits and the requested number of communication credits; and using the minimum as the initial number.

15. A mobile communication appliance comprising a secure module for securely storing data, wherein the secure module comprises means for generating a reload request message and for authenticating at least part of the reload request message; the reload request message comprising an identification of the secure module and a module transaction number;

the mobile communication appliance comprises transmission means for transmitting the authenticated reload request message to a reload server; and reception means for receiving an authenticated reload grant message from the reload server; the reload grant message comprising an indication of a granted number of communication credits and a server transaction number and at least part of the reload grant message being authenticated; and the secure module further comprises:

means for confirming the authentication of the authenticated reload grant message;

means for, upon a positive confirmation, determining a new module transaction number from the module transaction number, verifying whether the new module transaction number matches the server transaction number, and, upon positive verification, updating a balance of communication credits stored in the secure module according to the granted number of communication credits and storing the new module transaction number as the module transaction number;

wherein one of said reload server and said mobile communication appliance comprises means for registering an attempt to fraud upon receiving one of a reload request message having a module transaction number outside a predetermined range of the server transaction number and upon receiving a reload grant message having a server transaction number outside another predetermined range of the module transaction number.

16. A mobile communication appliance as claimed in claim 15, wherein the mobile communication appliance comprises user interface means; and means for informing a user that reloading communication credits is in progress, in response to receiving the acknowledgement message.

17. A mobile communication appliance as claimed in claim 15, wherein the secure module comprises means for, in response to a trigger from the mobile communication appliance to reload a specified number of communication credits, checking whether the specified number of communication credits falls within a predetermined communication credit range stored in the secure module; and upon a positive outcome of the checking incorporating the specified number in the reload request message.

18. A mobile communication appliance as claimed in claim 17, wherein the mobile communication appliance comprises user interface means, and means for reading the communication credit range and communication credit balance from the secure module and using the user interface means to present the communication credit range and communication credit balance to a user.

19. A mobile communication appliance as claimed in claim 18, wherein the mobile communication appliance comprises means for using the user interface means to receive input from a user requesting a reload of a specified number of communication credits; for checking whether the specified number of communication credits falls within the communication credit range read from the secure module; and for issuing to the secure module the trigger to reload if the outcome of the checking is positive.

20. A secure module for use in mobile communication appliance as claimed in claim 13.

* * * * *